US008220020B2

(12) United States Patent
Deshpande

(10) Patent No.: US 8,220,020 B2
(45) Date of Patent: Jul. 10, 2012

(54) SYSTEMS AND METHODS FOR ENHANCED DISPLAY AND NAVIGATION OF STREAMING VIDEO

(75) Inventor: Sachin G. Deshpande, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1336 days.

(21) Appl. No.: 10/675,028

(22) Filed: Sep. 30, 2003

(65) Prior Publication Data
US 2005/0071886 A1  Mar. 31, 2005

(51) Int. Cl.
*G06F 3/00* (2006.01)
*G06F 13/00* (2006.01)
*H04N 5/445* (2011.01)

(52) U.S. Cl. ............... 725/37; 725/86; 725/87; 725/88; 725/135; 725/139; 715/716

(58) Field of Classification Search .................. 725/135, 725/139, 88, 86, 87
See application file for complete search history.

(56) References Cited

U.S. PATENT DOCUMENTS

| | | | |
|---|---|---|---|
| 5,442,744 A | 8/1995 | Piech et al. | |
| 6,172,672 B1 * | 1/2001 | Ramasubramanian et al. | 715/720 |
| 6,222,532 B1 * | 4/2001 | Ceccarelli | 715/723 |
| 6,418,473 B1 | 7/2002 | St. Maurice et al. | |
| 6,711,741 B2 * | 3/2004 | Yeo | 725/87 |
| 6,747,674 B1 * | 6/2004 | Asami | 715/721 |
| 7,251,790 B1 * | 7/2007 | Drucker et al. | 715/838 |
| 7,366,241 B2 * | 4/2008 | Matsui | 375/240.27 |
| 2002/0075572 A1 * | 6/2002 | Boreczky et al. | 359/722 |
| 2002/0140719 A1 * | 10/2002 | Amir et al. | 345/716 |
| 2002/0144276 A1 * | 10/2002 | Radford et al. | 725/87 |
| 2002/0188959 A1 | 12/2002 | Piotrowski | |
| 2003/0016254 A1 | 1/2003 | Abe | |
| 2003/0098869 A1 * | 5/2003 | Arnold et al. | 345/589 |
| 2004/0068536 A1 * | 4/2004 | Demers et al. | 709/201 |
| 2004/0268400 A1 * | 12/2004 | Barde et al. | 725/94 |

FOREIGN PATENT DOCUMENTS

| | | |
|---|---|---|
| EP | 1 014 719 | 6/2000 |
| JP | 6-043839 | 8/1995 |
| JP | 2001-309 283 | 11/2001 |
| JP | 2002-354 451 | 12/2002 |

OTHER PUBLICATIONS

Synchronized Multimedia Integration Language (SMIL) 1.0 Specification, W3C Recommendation, Jun. 1998, http://www.w3.org/TR/REC-smil/.
Synchronized Multimedia Integration Language (SMIL 2.0), W3C Recommendation, Aug. 2001, http://www.w3.org/TR/smil20/.

(Continued)

*Primary Examiner* — Scott Beliveau
*Assistant Examiner* — Kunal Langhnoja
(74) *Attorney, Agent, or Firm* — Austin Rapp & Hardman

(57) ABSTRACT

Systems and methods for enhanced navigation of streaming video are disclosed. An exemplary method involves receiving a video as it is streamed from a server over a computer network. A first user request is received to display a first navigation video strip on the display device. The first navigation video strip includes a first plurality of video frames from the video. In response to the first user request, first instructions are obtained for displaying the first navigation video strip. The first navigation video strip is then displayed on the display device in accordance with the first instructions.

45 Claims, 7 Drawing Sheets

OTHER PUBLICATIONS

H. Schulzrinne, A. Rao, R. Lanphier, "Real Time Streaming Protocol (RTSP)", IETF RFC 2326, Real Time Streaming Protocol (RTSP), Apr. 1998, http://www.ietf.org/rfc/rfc2326.txt.

Fielding R., Gettys J., Mogul J. C., Frystyk H., Masinter L., Leach P., Berners-Lee T., "Hypertext Transfer Protocol—HTTP 1.1," RFC 2616, Jun. 1999, http://www.ietf.org/rfc/rfc2616.txt.

UPnP Content Directory Service ContentDirectory:1 Service Template Version 1.01 for Universal Plug and Play Version 1.0, Date: Jun. 25, 2002, http://www.upnp.org/download/ContentDirectory%201.0.prtad.pdf.

M. Handley, V. Jacobson, "SDP: Session Description Protocol", IETF RFC 2327, Apr. 1998, http://www.ietf.org/rfc/rfc2327.txt.

* cited by examiner

SYSTEMS AND METHODS FOR ENHANCED DISPLAY AND NAVIGATION OF STREAMING VIDEO

TECHNICAL FIELD

The present invention relates generally to digital video technology. More specifically, the present invention relates to navigation of a video that is streamed from a server to a client over a network.

BACKGROUND

A video signal is typically made up of a number of frames, where each frame represents an image. The individual frames are displayed at a high enough rate so that a moving image is presented to a viewer. A digital video signal is a video signal in digital form. A digital video signal may be created using a digital video source, such as a digital video camera. Alternatively, an analog video signal may be converted to digital form through the use of a frame grabber or other similar device.

Digital video files may be transmitted from a server to a client over a one or more computer networks. When a client requests a digital video from a server, the client typically provides the server with the address of the digital video, such as the Universal Resource Locator (URL) of the digital video. The server then accesses the digital video and sends or "streams" it to the client as a continuous data stream. Streaming video is typically sent in compressed form over the network, and is generally played by a video player on the client as it arrives. With streaming video, client users typically do not have to wait to download a large video file before seeing the video and/or hearing the sound. Instead, the video is sent in a continuous stream and is played as it arrives.

Currently in a networked system, a user watching a streamed video is presented at the client side with a video display and some controls, which the user can use to interact with the video. The controls typically include a fast forward control, a fast backward control, a pause control, and a seek control (typically implemented with a slider). Additionally, the user may be given an indication of the total duration of the video, and the current timeline location for the video being displayed with respect to the total duration.

In some situations a user may want to skim through different segments of the video in order to choose a portion of the video which interests him or her. To do this in known systems, the user typically randomly selects one or more locations on the video timeline and plays the video from those locations in order to see what those video segments look like. The user may do this multiple times before he or she can settle for some portion of the video which is of interest.

In view of the above, benefits may be realized by systems and methods which enable more convenient navigation of streaming video.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

Figure 1:
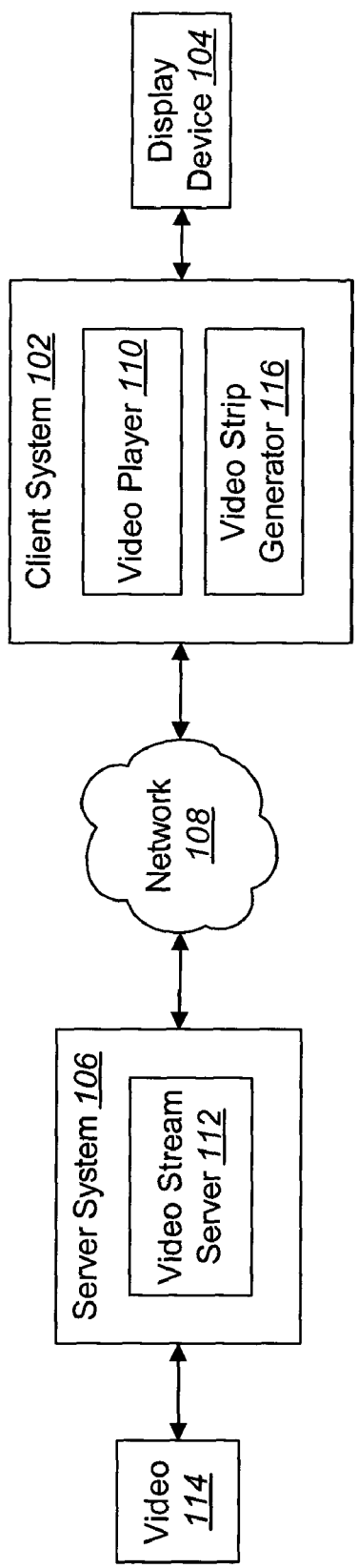
FIG. 1 is a block diagram illustrating an exemplary operating environment in which some embodiments may be practiced.

A method in a client system for enhancing navigation of a video is disclosed. The method involves receiving the video as it is streamed from a server over a computer network. A first user request is received to display a first navigation video strip on a display device. The first navigation video strip includes a first plurality of video frames from the video. In response to the first user request, first instructions for displaying the first navigation video strip are obtained. The first navigation video strip is displayed on the display device in accordance with the first instructions.

The first instructions may be obtained in a variety of ways. For example, obtaining the first instructions may involve generating the first instructions. Alternatively, obtaining the first instructions may involve transmitting a first client request to the server to generate the first instructions and then receiving the first instructions from the server. Alternatively still, obtaining the first instructions may involve transmitting a first client request to the server to generate the first instructions and then receiving a reference to the first instructions from the server.

The first instructions may be formatted in a variety of ways. In some embodiments, the first instructions may be formatted according to the Synchronized Multimedia Integration Language.

Displaying the first navigation video strip may involve retrieving the first plurality of video frames from the server. The first plurality of video frames may be retrieved from the server in accordance with the Real Time Streaming Protocol.

The method may also involve supporting user interaction with the first navigation video strip. This may involve receiving a user selection of one of the first plurality of video frames, and in response to the user selection, playing the video on the display device beginning at the selected video frame. Alternatively, where amount of time separating adjacent video frames in the first navigation video strip may be substantially equal to a first time interval, supporting the user interaction may involve receiving a second user request to modify the first time interval to a second time interval. In response to the second user request, second instructions may be obtained for displaying a second navigation video strip. The amount of time separating adjacent video frames in the second navigation video strip may be substantially equal to the second time interval. The second navigation video strip may be displayed in accordance with the second instructions.

A method in a server system for enhancing navigation of a video is also disclosed. The method involves streaming the video to a client over a computer network. A first client request to generate first instructions for displaying a first navigation video strip on a display device is received. The first navigation video strip includes a first plurality of video frames from the video. The method also involves generating the first instructions. The first instructions may be transmitted to the client. Alternatively, a reference to the first instructions may be transmitted to the client.

A client system configured to facilitate enhanced navigation of a video is disclosed. The client systems includes a processor and memory in electronic communication with the processor. The client system also includes a video player configured to implement a method. The method involves receiving the video as it is streamed from a server over a computer network. A first user request is then received to display a first navigation video strip on a display device. The first navigation video strip includes a first plurality of video frames from the video. First instructions for displaying the first navigation video strip are obtained. The first navigation video strip is displayed on the display device in accordance with the first instructions.

The client system may include a video strip generator that generates the first instructions in response to the first user request. In such an embodiment, obtaining the first instructions may involve receiving the first instructions from the video strip generator.

Alternatively, obtaining the first instructions may involve transmitting a first client request to the server to generate the first instructions. The first instructions or a reference to the first instructions may be received from the server. The first instructions may be formatted according to the Synchronized Multimedia Integration Language.

Displaying the first navigation video strip may involve retrieving the first plurality of video frames from the server. The first plurality of video frames may be retrieved from the server in accordance with the Real Time Streaming Protocol.

The method implemented by the video player may also involve supporting user interaction with the first navigation video strip. Supporting the user interaction may involve receiving a user selection of one of the first plurality of video frames. In response to the user selection, the video may be played on the display device beginning at the selected video frame. Alternatively, where the amount of time separating adjacent video frames in the first navigation video strip is substantially equal to a first time interval, supporting the user interaction may involve receiving a second user request to modify the first time interval to a second time interval. In response to the second user request, second instructions for displaying a second navigation video strip may be obtained. The amount of time separating adjacent video frames in the second navigation video strip may be substantially equal to the second time interval. The second navigation video strip may be displayed on the display device in accordance with the second instructions.

A server system configured to facilitate enhanced navigation of a video is also disclosed. The server system may include a processor and memory in electronic communication with the processor. The server system may also include a video stream server configured to stream a video to a client over a computer network. The server system may also include a video strip generator configured to implement a method. The method may involve receiving a first client request to generate first instructions for displaying a first navigation video strip. The first navigation video strip may include a plurality of video frames from the video. The method may also involve generating the first instructions. The first instructions, or a reference to the first instructions, may be transmitted to the client.

A set of executable instructions for implementing a method for enhancing navigation of a video that is being streamed from server to a client over a computer network is also disclosed. The method may involve receiving a request to generate video strip instructions for displaying a navigation video strip that comprises a plurality of video frames from the video. In response to the request, the video strip instructions may be generated while the video is being streamed from the server to the client. The video strip instructions, or a reference to the video strip instructions, may be provided to a video player.

User input may be received about a variety of things. For example, user input may be received about the number of video frames that are included in the navigation video strip. User input may also be received about the number of video frames in the navigation video strip that are displayed on the display device. User input may also be received about a location where the navigation video strip is displayed. The method may involve receiving a user selection of an option concerning how the video is managed while the navigation video strip is displayed. The option may be selected from the group consisting of scaling the video, cropping the video, and alpha-blending the video with the navigation video strip. Alternatively, or in addition, the option may be selected from the group consisting of playing the video, pausing the video, and stopping the video.

Various embodiments of the invention are now described with reference to the Figures, where like reference numbers indicate identical or functionally similar elements. It will be readily understood that the components of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Those skilled in the art will appreciate that many features of the embodiments disclosed herein may be implemented as computer software, electronic hardware, or combinations of both. To clearly illustrate this interchangeability of hardware and software, various illustrative modules will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, those skilled in the art will recognize that such software may include any type of computer instruction or computer executable code located within a memory device and/or transmitted as electronic signals over a system bus or network. Software that implements the functionality associated with a module described herein may comprise a single instruction, or many instructions, and may be distributed over several different code segments, among different programs, and across several memory devices.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

FIG. 1 is a block diagram illustrating an exemplary operating environment in which some embodiments may be practiced. A client system 102 is shown. Examples of client systems 102 that may be used with embodiments disclosed herein include a computer or a television with data processing capability (e.g., a television in electronic communication with a set-top box, or a television with an integrated CPU). The client 102 includes or is in electronic communication with a display device 104.

The client system 102 is in electronic communication with a server system 106 over one or more computer networks 108. Thus, data transmitted from the client 102 to the server 106, and vice versa, may pass through one or more intermediate nodes en route to its destination. Embodiments may be used in local area networks (LANs), storage area networks (SANs), metropolitan area networks (MANs), wide area networks (WANs), and combinations thereof (e.g., the Internet) with no requirement that the client 102 and server 106 reside in the same physical location, the same network 108 segment, or even in the same network 108. A variety of different network configurations and protocols may be used, including Ethernet, TCP/IP, UDP/IP, IEEE 802.11, IEEE 802.16, Bluetooth, asynchronous transfer mode (ATM), fiber distributed data interface (FDDI), token ring, and so forth, including combinations thereof. Of course, some embodiments may also be practiced with conventional point-to-point connections, such as enterprise systems connection (ESCON), small computer system interface (SCSI), fibre channel, etc., that may not typically be viewed as a "network."

The client 102 is equipped with a video player 110. Examples of video players 110 that are commercially available and that may be used with embodiments disclosed herein include Windows® Media Player, RealOne® Player, QuickTime®, etc. Of course, these examples are to be considered as illustrative only, and not limiting; those skilled in the art will recognize many other video players 110 that may be used with embodiments disclosed herein. The video player 110 is configured to play video files on the display device 104.

The server system 106 includes a video stream server 112 that is configured to transmit a video 114 to the client 102 in a continuous stream over the network 108. This process is commonly referred to as "streaming." An example of a video stream server 112 that is commercially available and configured for use with embodiments disclosed herein is Helix®, available from RealNetworks®. Of course, this example is to be considered as illustrative only, and not limiting; those skilled in the art will recognize many other video stream servers 112 that may be used with embodiments disclosed herein. In typical operation, the video player 110 processes the video 114 as it is received from the video stream server 112, plays the video 114 on the display device 104, and then discards the video 114 without storing it.

Sometimes a person who is watching a video 114 on the client system 102 may wish to "navigate" the video 114. For example, a user may wish to move to a different location in the video 114, view different portions of the video 114 in order to select a portion that is of interest, etc. To facilitate easier navigation of the video 114, the client system 102 is equipped with a video strip generator 116. The video strip generator 116 is configured to generate a navigation video strip (not shown in FIG. 1) that may be displayed on the display device 104 and that facilitates easier navigation of the video 114. In some embodiments, the video strip generator 116 is an auxiliary program that works together with the video player 110. For example, the video strip generator 116 may be a plug-in for the video player 110. Additional details about various exemplary embodiments of the navigation video strip and the video strip generator 116 will be provided below.

Figure 2:
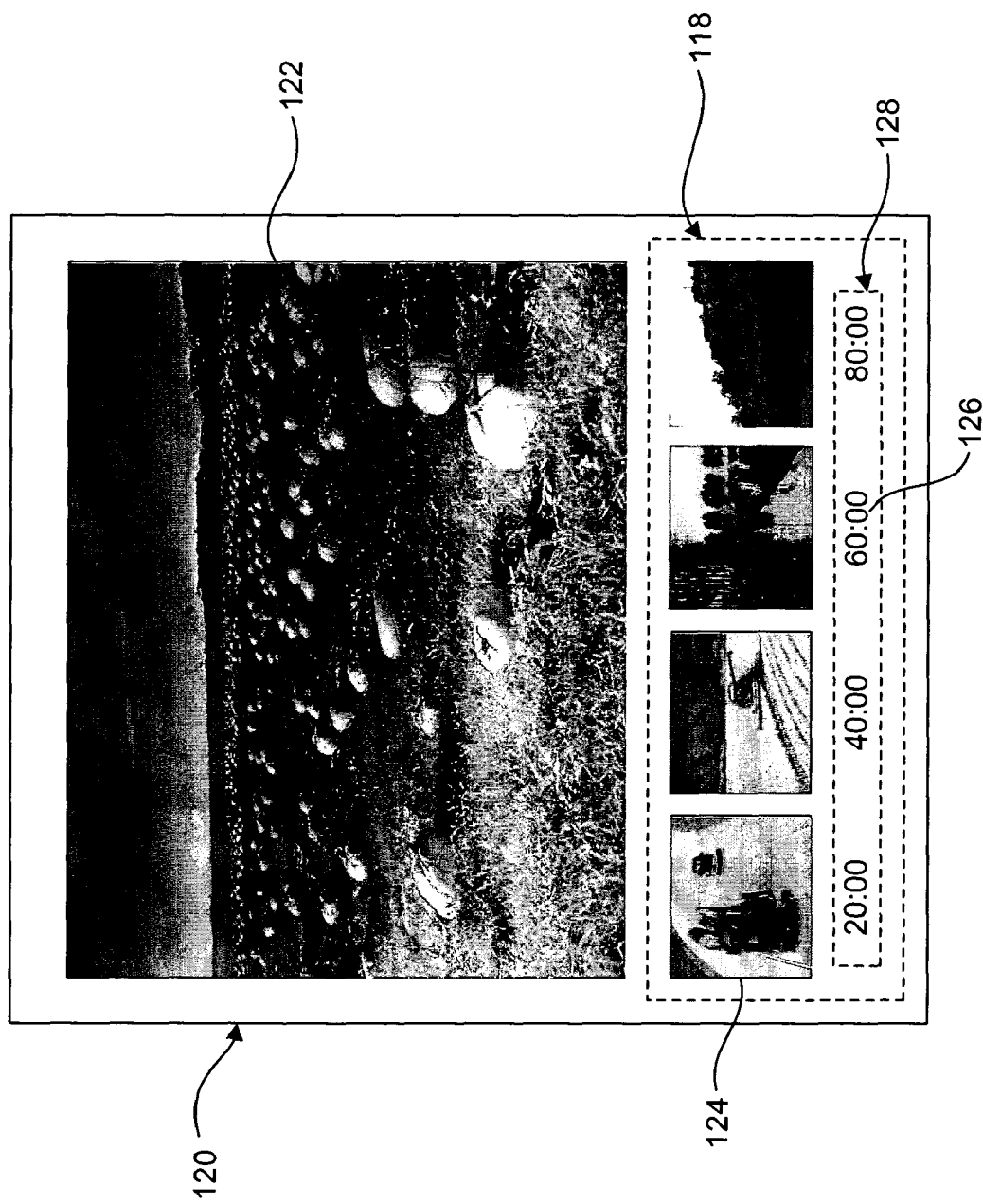
FIG. 2 illustrates a video and a navigation video strip being displayed on a display screen of a display device.

FIG. 2 illustrates a video 114 and a navigation video strip 118 being displayed on the display screen 120 of the display device 104. The video 114 is shown in a primary viewing area 122 of the display screen 120. The navigation video strip 118 is positioned beneath the primary viewing area 122. Of course, in other embodiments the navigation video strip 118 may be positioned in other locations relative to the primary viewing area 122.

The navigation video strip 118 includes several video frames 124 taken from the video 114. Each video frame 124 is scaled to fit within an area that is significantly smaller than the primary viewing area 122. Thus, relatively small "thumbnail" images are displayed for each of the frames 124 in the video strip 118. Each video frame 124 is associated with a timestamp 126 that indicates the temporal location of that video frame 124 within the video 114. The timestamp 126 of each video frame 124 is displayed in a timeline 128 within the navigation video strip 118.

In typical embodiments, when the navigation video strip 118 is not displayed, the video 114 occupies substantially all of the display screen 120. The primary viewing area 122 is reduced in size to accommodate the video strip 118. The video 114 may be scaled or clipped to fit within the smaller primary viewing area 122. Alternatively, the video strip 118 may be displayed by alpha blending it with the video 114. This would allow the video 114 to be displayed at the same time as the video strip 118 without clipping or scaling the video 114.

In the illustrated embodiment, the video frames 124 are uniformly spaced, i.e., the amount of time separating adjacent video frames 124 is approximately the same. In addition, the video frames 124 are arranged sequentially in time from left to right. The timestamp 126 of the $i^{th}$ video frame 124 is equal to $$\frac{iT}{N+1},$$

where T is the total duration of the video 114 and N is the number of video frames 124 in the video strip 118. Four video frames 124 are included in the video strip 118 shown in FIG. 2. Thus, all of the video frames 124 in the video strip 118 are visible on the display screen 120. (In some embodiments, all of the video frames 124 in the video strip 118 may not be visible on the display screen 120 at the same time. This will be discussed below.) If the total duration of the video 114 is 1 hour 40 minutes (100 minutes), the video strip 118 includes video frames 124 with timestamps 126 of 20, 40, 60, and 80 minutes, respectively. Of course, in alternative embodiments, the video frames 124 may be non-uniformly spaced and/or arranged non-sequentially.

Figure 3:
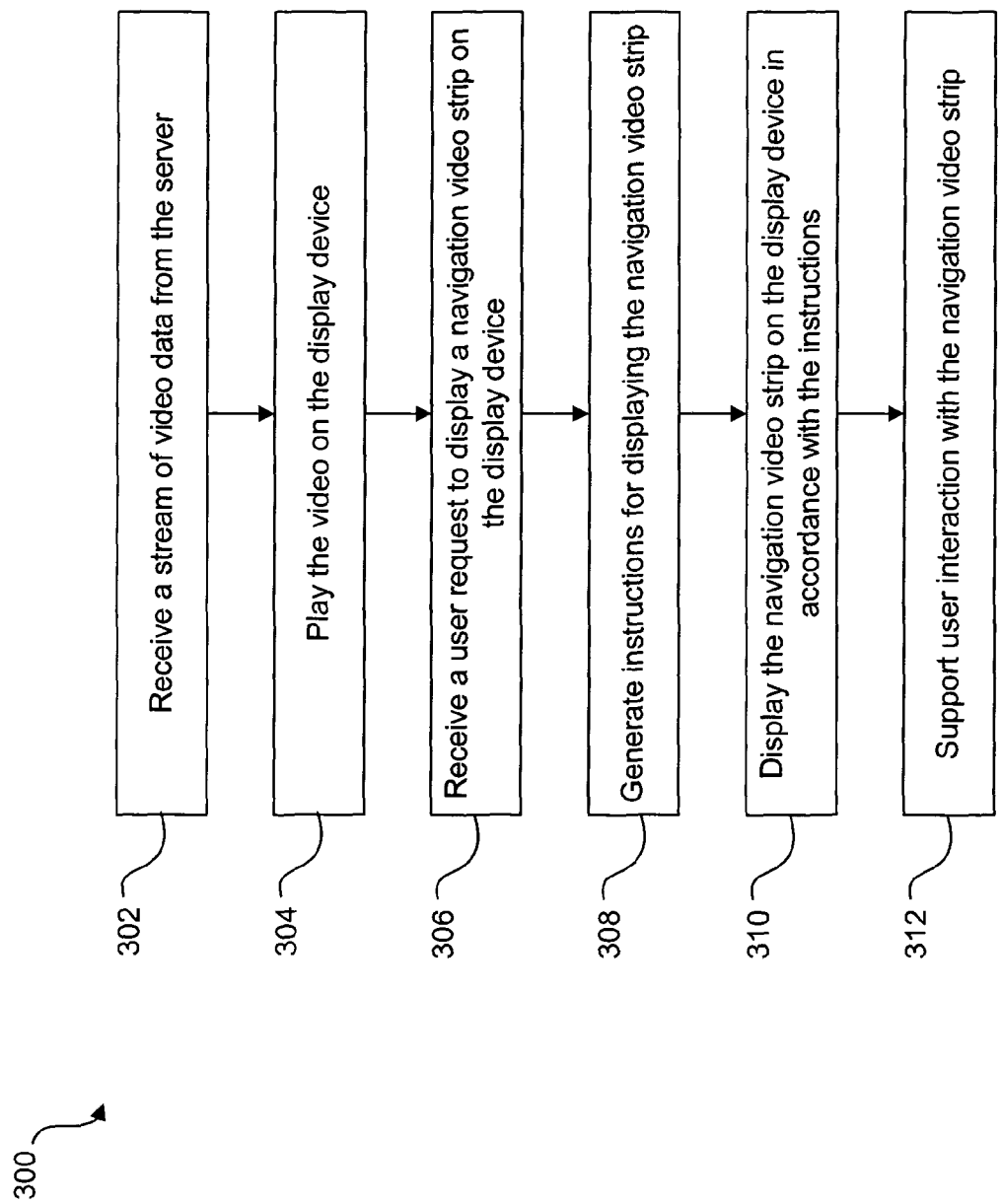
FIG. 3 is a flow diagram illustrating an embodiment of a method that may be performed by the different components in the operating environment shown in FIG. 1.

FIG. 3 is a flow diagram illustrating an embodiment of a method 300 that may be performed by the different components in the operating environment shown in FIG. 1. The method 300 begins when the video stream server 112 streams a video 114 to the client 102 over a computer network 108. The streamed video 114 is received 302 by the video player 110, which processes (e.g., decodes) the received video data and plays 304 the video 114 on the display device 104. At some point, a user of the client 102 may decide that he or she would like to navigate the video 114. The user then inputs a user request to display a navigation video strip 118 on the display device 104.

When the video player 110 receives 306 the user request, the video player 110 sends a request to the video strip generator 116 on the client 102 to generate instructions for displaying the requested video strip 118. In response, the video strip generator 116 generates 308 the requested instructions, and provides them to the video player 110.

The instructions generated 308 by the video strip generator 116 are typically contained in a document that is readable by the video player 110. In some embodiments, the document may be formatted according to the Synchronized Multimedia Integration Language (SMIL). Such a document is typically referred to as a SMIL document. Many commercially available video players 110 are configured to read SMIL documents.

The instructions for generating the video strip 118 typically include information about the number of video frames 124 that are to be included in the video strip 118, as well as the number of video frames 124 that are to be visible within the display screen 120. (In some embodiments, all of the video frames 124 within the video strip 118 may not be shown on the display screen 120 at the same time.) These values may be specified in a configurable user preference setting, for which default values may be provided. Information about where the video frames 124 are to be displayed on the display screen 120 (e.g., below the primary viewing area 122, to the right of the primary viewing area 122, etc.) may also be included. Additionally, the instructions for displaying the video strip 118 may include information about how the video frames 124 may be retrieved from the server 106. For example, the timestamps 126 of the video frames 124 in the video strip 118 may be included in the instructions.

As described above, in some embodiments the timestamp 126 of the $i^{th}$ video frame 124 is equal to $$\frac{iT}{N+1},$$

where T is the total duration of the video 114. Thus, in embodiments where the instructions generated by the video strip generator 116 include the timestamps 126 of the video frames 124 to be included in the video strip 118, the video strip generator 116 may be configured to determine the total duration of the video 114 that is being played. This information may be obtained by means of the Real Time Streaming Protocol (RTSP) GET_PARAMETER method; the Universal Plug and Play (UPNP) Content Directory Service (CDS) res element, duration attribute; the Session Description Protocol (SDP) media attribute (a) parameter; etc. Alternatively, the video payload data may have some information about the total duration of the video stream.

Once instructions for displaying the navigation video strip 118 have been generated 308, the video player 110 reads the instructions and displays 310 the navigation video strip 118 on the display device 104 in accordance with those instructions. For example, if the instructions are contained in a SMIL document, the video player 110 reads the SMIL document and processes the information contained therein in order to display the navigation video strip 118 on the display screen 120.

The instructions generated by the video strip generator 116 in step 308 typically do not include the video frames 124 themselves (although they may). Rather, the instructions typically include information about how the video frames 124 may be retrieved from the video stream server 112. Thus, in order to display 310 the video strip 118, the video player 110 generally retrieves the video frames 124 that are to be included in the video strip 118 from the video stream server 112.

The video frames 124 may be retrieved from the video stream server 112 in accordance with the RTSP protocol. For example, if $T_i$ is the timestamp 126 of the $i^{th}$ video frame 124 to be displayed in the video strip 118 (where i=1, . . . , N), the client 102 may send N RTSP PLAY requests with the normal play time (npt) of a request set to begin at $T_i$ and set to end at $T_i$+d. The value of d will be discussed below. The RTSP video payload data obtained from the video stream server 112 may then be decoded and displayed for each of the RTSP PLAY requests. If the video and audio stream for the current video 114 being displayed are separate streams, then the requests may be sent only for the video stream. If the video and audio streams are interleaved, the audio data received from the video stream server 112 may be discarded so that only the video data is decoded and displayed in the display area corresponding to each video frame 124.

The value of d is preferably set equal to one frame duration of the video 114. In other words, $$d = \frac{1}{F},$$

where F is the frame rate of the video 114 in frames per second (fps). The frame rate of the video 114 is typically available as an SDP media attribute. However, if the video player 110 has no knowledge about the frame rate of the video 114, then d may be set to some small value. For example d may be set to 0.1 seconds (which would be the ideal value for a video 114 with a frame rate of 10 fps).

Under some circumstances, the video stream server 112 may modify a request from the video player 110 for a particular video frame 124. For example, if the client 102 requests a predictive-coded frame 124, the server 106 may modify the request to send an intra-coded frame 124. In this case the RTSP npt header sent by the video stream server 112 may be used to display the timestamp 126 for this video frame 124. If the video stream server 112 does not have the ability to determine whether a particular video frame 124 is an intra-coded frame or a predictive-coded frame, the video player 110 may discard the obtained video payload data until an intra-coded frame 124 arrives, at which point it can start to decode and display the streaming video 114.

Once the video strip 118 is displayed on the display screen 120, the video player 110 typically also supports 312 user interaction with the video strip 118. For example, the video player 110 may permit a user to move to a location in the video 114 that corresponds to one of the video frames 124 in the video strip 118. In other words, in response to a user selection of one of the video frames 124, the video player 110 may begin playing the video 114 on the display device 104 beginning at the selected video frame 124.

An example of how this may be accomplished in accordance with the RTSP protocol will now be described. The video player 110 sends an RTSP PAUSE request for the video 114 stream to the video stream server 112. The video player 110 then sends an RTSP PLAY request for the video 114 to the video stream server 112 with the npt field set to the timestamp 126 of the selected video frame 124 from the video strip 118.

More specifically, the video player 110 may transmit the following to the video stream

```
PAUSE rtsp://homeserver.com/video/lccl.rm RTSP/1.0
CSeq: 48
Session: 8568
```

The video stream server 112 may then transmit the following to the video player 110:

```
RTSP/1.0 200 OK
CSeq: 48
Date: 2 Jan 2003 10:18:09 GMT
```

The video player 110 may then transmit the following to the video stream server 112:

```
PLAY rtsp://homeserver.com/video/lccl.rm RTSP/1.0
CSeq: 49
Range: npt=85–
```

The video stream server 112 may then transmit the following to the video player 110:

```
RTSP/1.0 200 OK
CSeq: 49
Range: npt=84–
```

Another example of supporting 312 user interaction with the video strip 118 involves allowing the user to change the time interval between adjacent video frames 124 in the video strip 118. A user may wish to increase the time interval between adjacent frames 124 if, for example, two frames 124 from the same scene are displayed in the video strip 118. A user may wish to decrease the time interval between adjacent frames 124 if, for example, he or she is looking for a particular scene in the video 114 but no frame 124 from that scene is included in the video strip 118.

In response to a user request to modify the time interval between adjacent frames 124, the video player 110 typically sends a request to the video strip generator 116 to generate new instructions for displaying a new navigation video strip 118. In the new navigation video strip 118, the time interval between adjacent video frames 124 is modified in accordance with the user's request. Once the video strip generator 116 generates the instructions, they are provided to the video player 110. The video player 110 may then display the new video strip 118 on the display device 104 in place of the previous video strip 118.

When the time interval between adjacent video frames 124 is changed, the number of video frames 124 in the video strip 118 generally also changes. The number of video frames 124 displayed on the display screen 120 typically does not change, although it may.

As discussed above, the time interval between adjacent frames 124 may be uniform throughout the video strip 118. For example, the timestamp 126 of the $i^{th}$ frame 124 may be given by $$\frac{iT}{N+1},$$

where T is the total duration of the video 114, and N is the number of video frames 124 in the video strip 118. In such an embodiment, the time interval between adjacent frames 124 would be given by $$\frac{T}{N+1}.$$

When the user requests that the time interval between adjacent frames 124 be increased, the value of N may be decreased, thereby causing the time interval between adjacent video frames 124 to increase. Conversely, when the user requests that the time interval between adjacent frames 124 be decreased, the value of N may be increased, thereby causing the time interval between adjacent video frames 124 to decrease. The value of N may increase or decrease incrementally, by some multiple of N (e.g., N may double each time the user requests that the time interval is decreased), or in accordance with a variety of other methods that will be readily apparent to those skilled in the art in view of the teachings contained herein.

For example, suppose that T=100 minutes, that N=4, and that only four video frames 124 are shown on the display screen 120 at any given time. In this example, the navigation video strip 118 initially consists of four video frames 124 having timestamps 126 of 20, 40, 60 and 80 minutes, respectively (as shown in FIG. 2). All of the video frames 124 in the video strip 118 are shown on the display screen 120. If the user makes three requests that the time interval between adjacent frames 124 be decreased (e.g., the user presses a button on a remote control three times), and if the value of N is incremented after each request, then N=7. The navigation video strip 118 would then consist of seven video frames 124 having timestamps 126 of 12.5, 25, 37.5, 50, 62.5, 75 and 87.5 minutes. Because only four video frames 124 are shown on the display screen 120 at any given time, only four of the video frames 124 in the video strip 118 would be shown on the display screen 120. The user may be allowed to scroll through the frames 124 in the navigation video strip 118.

The user may be allowed to specify the minimum number of video frames 124 to be included in a navigation video strip 118. This value will be referred to herein as $N_{min}$, and may correspond to the number of video frames 124 that are displayed on the display screen 120. In such a situation, the maximum time interval between adjacent video frames 124 in the video strip 118 may be equal to $$\frac{T}{N_{\min}+1}.$$

The minimum time interval between adjacent video frames 124 in the video strip 118 may be equal to $$\frac{1}{F},$$

where F is the frame rate of the video 114 in frames per second. Alternatively, the minimum time interval between adjacent frames 124 may be set equal to the spacing between intra-coded frames in the video 114.

Advantageously, in the exemplary method 300 just discussed, the instructions for displaying the navigation video strip 118 are generated dynamically as the video 114 is being streamed from the server 106 to the client 102. Thus, it is not necessary to store separate thumbnails or images from the video 114. In addition, the navigation video strip 118 may be generated automatically. Thus, there is no need for human indexing or pre-creation of the video strip 118.

Figure 4:
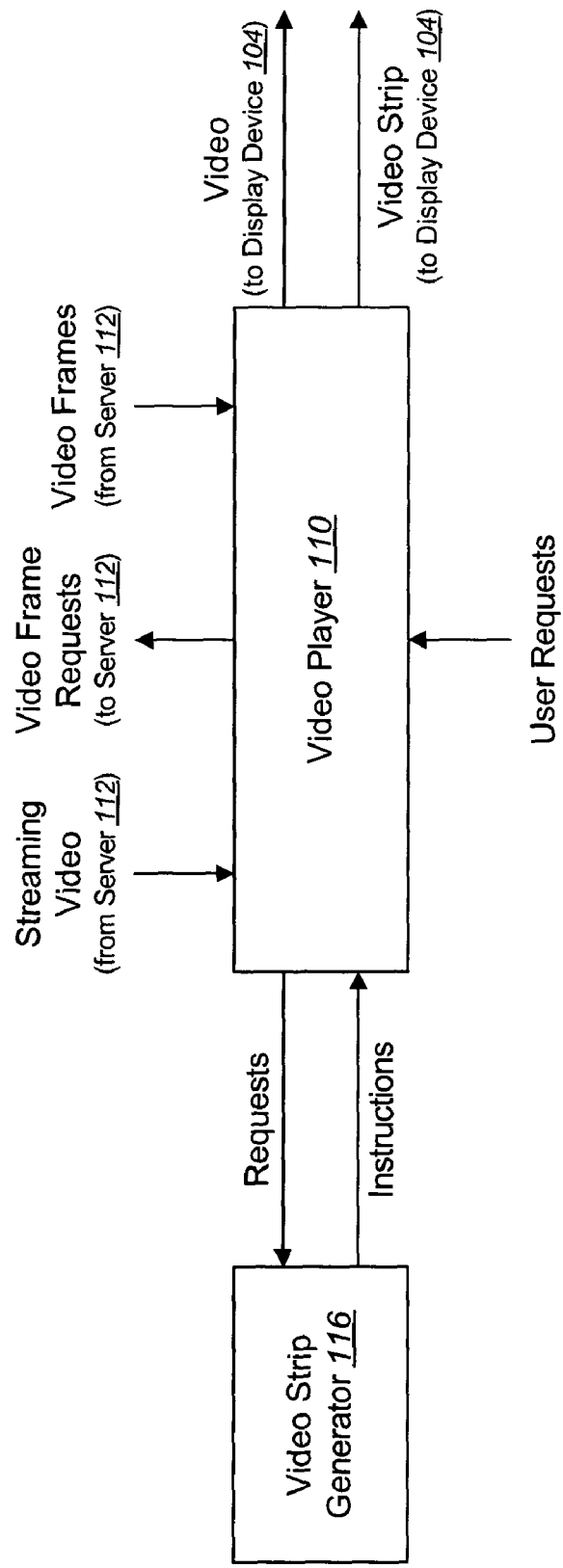
FIG. 4 is a functional block diagram illustrating the interaction between the video player and the video strip generator in the method shown in FIG. 3.

FIG. 4 is a functional block diagram illustrating the interaction between the video player 110 and the video strip generator 116 in the method 300 shown in FIG. 3. As shown, the video stream server 112 transmits a stream of video 114 to the video player 110. The video player 110 processes the video data in order to play the video 114 on the display device 104. At some point, the video player 110 receives a request from the user to display a navigation video strip 118 on the display device 104. The video player 110 then sends a request to the video strip generator 116 to generate instructions for displaying a navigation video strip 118. In response, the video strip generator 116 generates the instructions.

Once instructions for displaying the navigation video strip 118 have been generated, the video strip generator 116 provides the instructions to the video player 110. The video player 110 reads the instructions and displays the navigation video strip 118 on the display device 104 in accordance with the instructions.

As discussed previously, the instructions typically do not include the video frames 124 themselves. Instead, the instructions typically include information about how the video frames 124 may be retrieved from the video stream server 112. Thus, displaying the video strip 118 on the display device 104 may involve retrieving the video frames 124 that are to be included in the video strip 118 from the video stream server 112. The video player 110 may send requests to the video stream server 112 for the video frames 124 that are specified in the instructions. In response, the video stream server 112 sends the requested video frames 124 to the video player 110. The video player 110 then displays the video frames 124 in the video strip 118.

Once the video strip 118 is displayed on the display screen 120, the video player 110 typically also supports user interaction with the video strip 118. This may involve making one or more additional requests to the video strip generator 116 to generate new instructions for displaying a new video strip 118. For example, the video player 110 may receive a request from the user to change the time interval between adjacent video frames 124. The video player 110 may then send a request to the video strip generator 116 to generate new instructions for displaying a new navigation video strip 118 in which the time interval between adjacent video frames 124 has been modified in accordance with the user's request. The video strip generator 116 may then generate the instructions and provide them to the video player 110. The video player 110 may then display the new video strip 118 in accordance with the new instructions. In some embodiments, the video strip generator 116 may be part of the video player 110.

Figure 5:
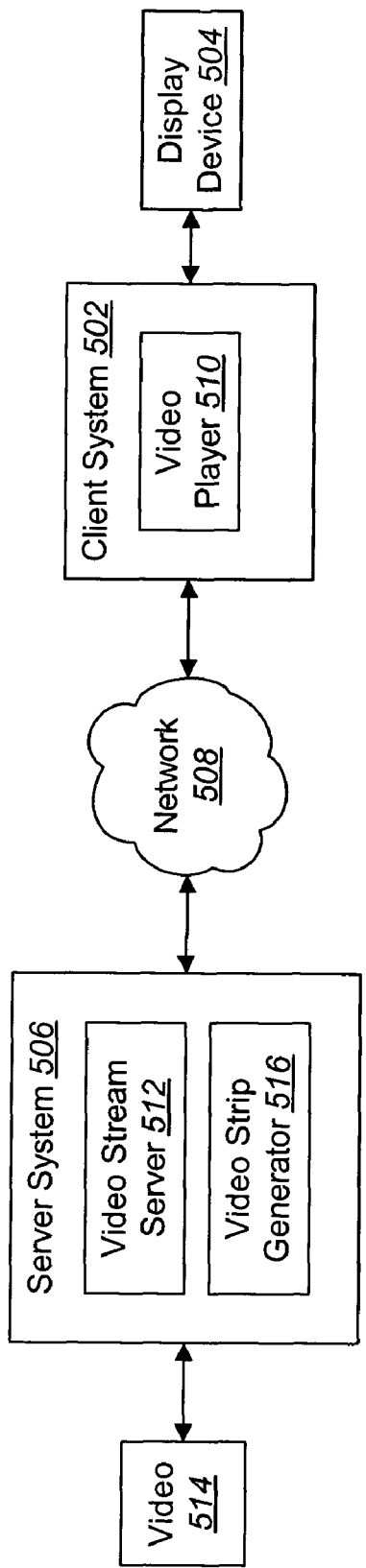
FIG. 5 is a block diagram illustrating an alternative operating environment in which some embodiments may be practiced.

FIG. 5 is a block diagram illustrating an alternative operating environment in which some embodiments may be practiced. The operating environment shown in FIG. 5 is similar to the operating environment shown in FIG. 1 except that the video strip generator 516 is located on the server system 506, instead of the client system 502. In this embodiment, the video strip generator 516 may be a Common Gateway Interface (CGI) application, an Active Server Page (ASP), a JavaServer Page (JSP), etc., that works together with the video stream server 512 on the server system 506.

Figure 6:
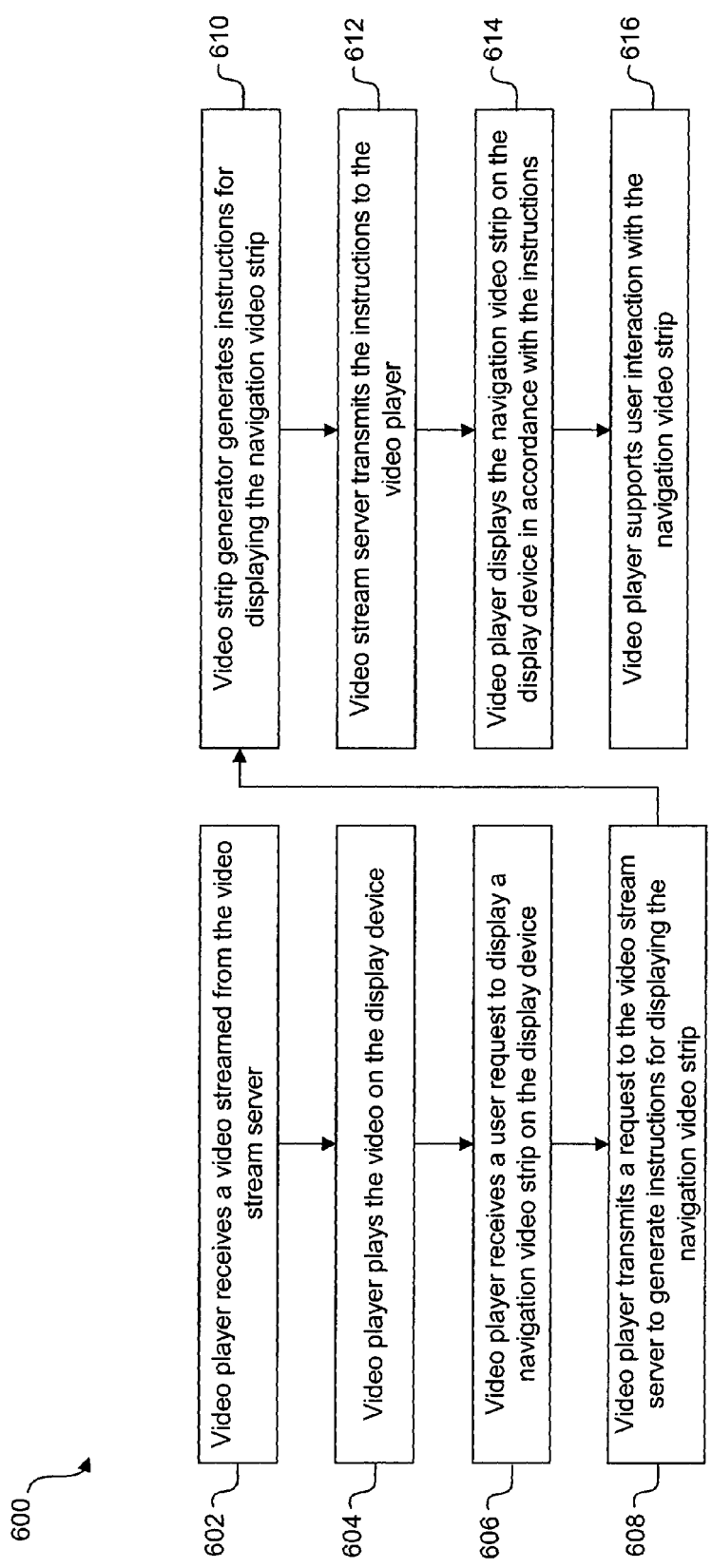
FIG. 6 is a flow diagram illustrating an embodiment of a method that may be performed by the different components in the operating environment shown in FIG. 5.

FIG. 6 is a flow diagram illustrating an embodiment of a method 600 that may be performed by the different components in the operating environment shown in FIG. 5. As before, the method 600 begins when the video player 510 receives 602 a video 514 streamed from the video stream server 512. The video player 510 processes this video data in order to play 604 the video 514 on the display device 504. At some point, a user of the client system 502 may decide that he or she would like to navigate the video 514. The user then inputs a user request to display a navigation video strip 118 on the display device 504.

When the video player 510 receives 606 the user request, the video player 510 then transmits 608 a request to the video stream server 512 to generate instructions for displaying the navigation video strip 118. The video stream server 512 then sends a request to the video strip generator 516 to generate the instructions. In response, the video strip generator 516 generates 610 the instructions. As before, the instructions may be stored in a document that is readable by the video player 510 on the client system 502, such as a SMIL document. The video stream server 512 then transmits 612 the instructions for displaying the navigation video strip 118 to the video player 510. Alternatively, the video stream server 512 may transmit a URL to the instructions for displaying the navigation video strip 118 to the video player 510. In this case, the video player 510 retrieves the instructions from this URL. The video player 510 retrieves and reads the instructions and displays 614 the navigation video strip 118 on the display device 504 in accordance with the instructions.

The video player 510 may support 616 user interaction with the navigation video strip 118. As before, supporting 616 user interaction with the video strip 118 may involve allowing the user to change the time interval between adjacent video frames 124 in the video strip 118. In the operating environment shown in FIG. 5, this may be accomplished as follows. In response to a user request to modify the time interval, the video player 510 may transmit a request to the video stream server 512 to generate instructions for displaying a new navigation video strip 118 that has the modified time interval requested by the user. The video stream server 512 then sends a corresponding request to the video strip generator 116, which generates the instructions and provides them to the video stream server 512. The video stream server 512 then transmits the instructions or a URL to the instructions back to the video player 510. The video player 510 on the client system 502 retrieves and reads the instructions and then displays the new navigation video strip 118 on the display device 504.

The requests sent from the video player 510 to the video stream server 512 may take the form of URL requests. For example, suppose that the user of the video player 510 inputs a request to decrease the time interval between adjacent video frames 124 by pressing a DOWN button on a remote control. In such a situation, the video player 510 may transmit the following URL request to the video stream server 512: http://smarthomeserver.com/sserve?key=DOWN&timestamp=40&SessionID=56473

As before, if all of the video frames 124 in the video strip 118 are not displayed at the same time, the user may be permitted to scroll between the different video frames 124. However, a user request to scroll between the video frames 124 is typically not sent to the video stream server 512, assuming that the instructions previously sent by the video stream server 512 include information about all of the video frames 124 in the video strip 118 (even those that are not initially viewable on the display screen 120).

Figure 7:
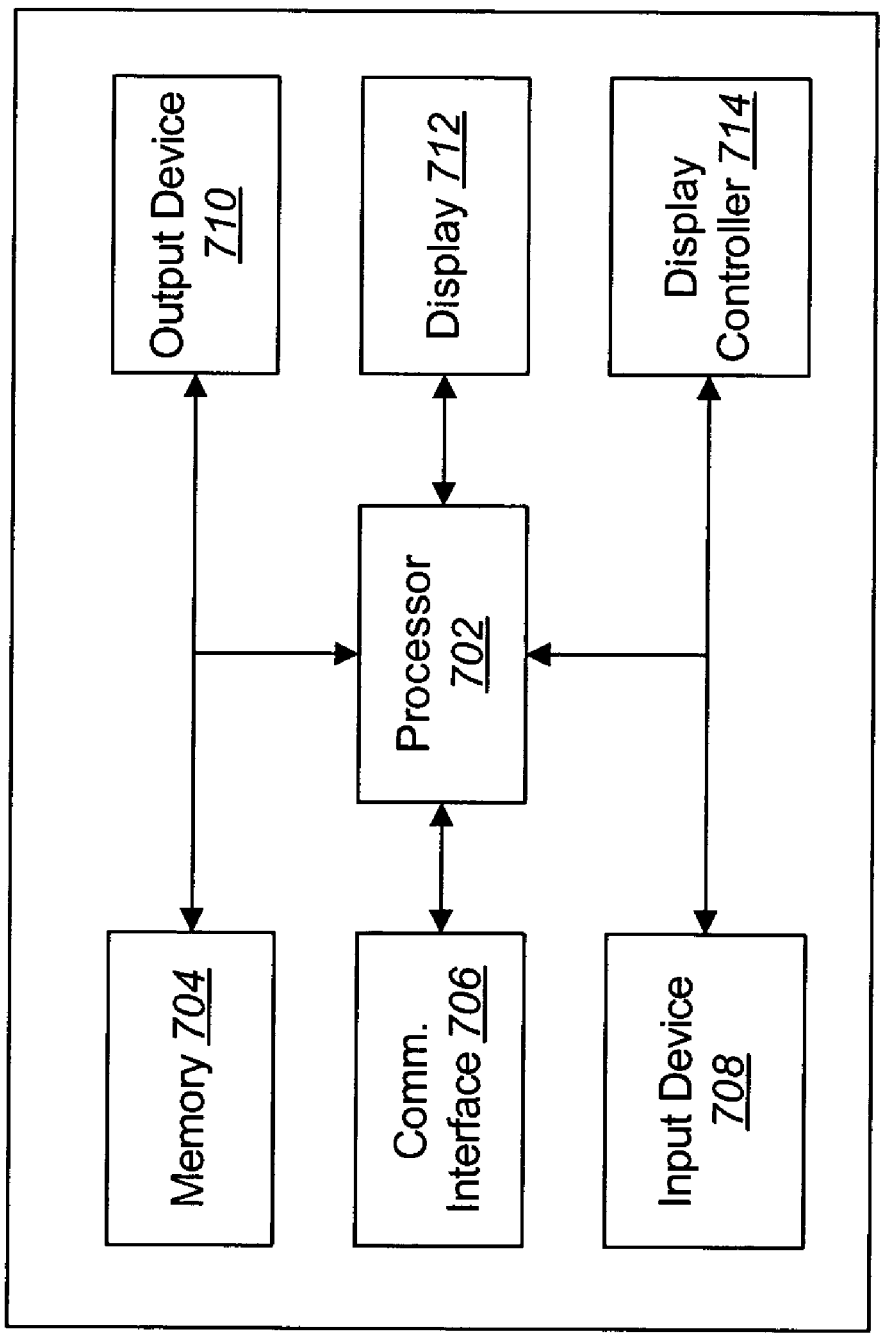
FIG. 7 is a block diagram illustrating the components typically utilized in a client system and/or a server system used with embodiments herein.

FIG. 7 is a block diagram illustrating the components typically utilized in a client system 102 and/or a server system 106 used with embodiments herein. The illustrated components may be logical or physical and may be implemented using any suitable combination of hardware, software, and/or firmware. In addition, the different components may be located within the same physical structure or in separate housings or structures.

The computer system shown in FIG. 7 includes a processor 702 and memory 704. The processor 702 controls the operation of the computer system and may be embodied as a microprocessor, a microcontroller, a digital signal processor (DSP) or other device known in the art. The processor 702 typically performs logical and arithmetic operations based on program instructions stored within the memory 704.

As used herein, the term "memory" 704 is broadly defined as any electronic component capable of storing electronic information, and may be embodied as read only memory (ROM), random access memory (RAM), magnetic disk storage media, optical storage media, flash memory devices in RAM, on-board memory included with the processor 702, EPROM memory, EEPROM memory, registers, etc. Whatever form it takes, the memory 704 typically stores program instructions and other types of data. The program instructions may be executed by the processor 702 to implement some or all of the methods disclosed herein.

The computer system typically also includes one or more communication interfaces 706 for communicating with other electronic devices. The communication interfaces 706 may be based on wired communication technology, wireless communication technology, or both. Examples of different types of communication interfaces 706 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system typically also includes one or more input devices 708 and one or more output devices 710. Examples of different kinds of input devices 708 include a keyboard, mouse, remote control device, microphone, button, joystick, trackball, touchpad, lightpen, etc. Examples of different kinds of output devices 710 include a speaker, printer, etc. One specific type of output device which is typically included in a computer system is a display device 712. Display devices 712 used with embodiments disclosed herein may utilize any suitable image projection technology, such as a cathode ray tube (CRT), liquid crystal display (LCD), light-emitting diode (LED), gas plasma, electroluminescence, or the like. A display controller 714 may also be provided, for converting data stored in the memory 704 into text, graphics, and/or moving images (as appropriate) shown on the display device 712.

Of course, FIG. 7 illustrates only one possible configuration of a computer system. Those skilled in the art will recognize that various other architectures and components may be utilized. In addition, various standard components are not illustrated in order to avoid obscuring aspects of the invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. In a client system, a method for enhancing navigation of a video, comprising:
receiving a video as it is streamed from a server over a computer network;
receiving a first user request to display a first navigation video strip on a display device, wherein the first navigation video strip comprises a first plurality of video frames from the video;
in response to the first user request, obtaining first instructions for displaying the first navigation video strip, wherein the first instructions do not include the first plurality of video frames;
obtaining the first plurality of video frames by requesting specific video frames from the server by sending from the client system separate play requests for the specific video frames in accordance with a video streaming protocol, wherein a normal play time of each play request begins at $T_i$ and ends at $T_i+d$, wherein $T_i$ is a timestamp of an $i^{th}$ video frame, and wherein d does not exceed one frame duration and the first plurality of video frames, which are used to display corresponding thumbnail images for the first navigation video strip, are identified after streaming the video from the server has commenced;
determining whether each obtained video frame of the first plurality of video frames is an intra-coded frame or a predictive-coded frame, and for each obtained video frame that is a predictive-coded frame, discarding the obtained video frame and obtaining a subsequent intra-coded frame;
displaying the first navigation video strip on the display device in accordance with the first instructions, wherein displaying the first navigation video strip comprises retrieving the first plurality of video frames from the server and displaying the corresponding thumbnail images; and
receiving user input about a location where the first navigation video strip is displayed and displaying the first navigation video strip on the display device in accordance with the user input.

2. The method of claim 1, wherein obtaining the first instructions comprises generating the first instructions.

3. The method of claim 1, wherein obtaining the first instructions comprises transmitting a first client request to the server to generate the first instructions.

4. The method of claim 3, wherein obtaining the first instructions further comprises receiving the first instructions from the server.

5. The method of claim 3, wherein obtaining the first instructions further comprises receiving a reference to the first instructions from the server.

6. The method of claim 1, wherein the first instructions are formatted according to a Synchronized Multimedia Integration Language.

7. The method of claim 1, wherein the first plurality of video frames are retrieved from the server in accordance with a Real Time Streaming Protocol (RTSP), and wherein requesting the specific video frames from the server comprises sending a separate RTSP PLAY request for each of the video frames.

8. The method of claim 1, further comprising supporting user interaction with the first navigation video strip.

9. The method of claim 8, wherein supporting the user interaction comprises:
receiving a user selection of one of the first plurality of video frames; and
in response to the user selection, playing the video on the display device beginning at the selected video frame.

10. The method of claim 8, wherein the amount of time separating adjacent video frames in the first navigation video strip is substantially equal to a first time interval, and wherein supporting the user interaction comprises:
receiving a second user request to modify the first time interval to a second time interval;
in response to the second user request, obtaining second instructions for displaying a second navigation video strip, wherein the amount of time separating adjacent video frames in the second navigation video strip is substantially equal to the second time interval; and
displaying the second navigation video strip in accordance with the second instructions.

11. The method of claim 1, wherein the method further comprises receiving user input about the number of video frames that are included in the first navigation video strip.

12. The method of claim 1, wherein the method further comprises receiving user input about the number of video frames in the first navigation video strip that are displayed on the display device.

13. The method of claim 1, further comprising:
receiving a user selection of an option concerning how the video is managed while the first navigation video strip is displayed, wherein the option is selected from the group consisting of cropping the video and alpha-blending the video with the first navigation video strip.

14. The method of claim 13, wherein the option is selected from the group consisting of playing the video, pausing the video, and stopping the video.

15. The method of claim 1, wherein the first plurality of video frames are retrieved from the server in accordance with a Real Time Streaming Protocol (RTSP), and wherein requesting the specific video frames from the server comprises sending an RTSP PAUSE request following by an RTSP PLAY request.

16. The method of claim 1, wherein the first instructions comprise a Synchronized Multimedia Integration Language (SMIL) document.

17. In a server system, a method for enhancing navigation of a video, comprising:
streaming a video to a client over a computer network;
receiving a first client request to generate first instructions for displaying a first navigation video strip on a display device, wherein the first navigation video strip comprises a first plurality of video frames from the video for displaying corresponding thumbnail images;
generating the first instructions, wherein the first instructions do not include the first plurality of video frames;
providing the first plurality of video frames to the client by receiving and responding to requests for specific video frames from the client, wherein receiving the requests for the specific video frames comprises receiving separate play requests for the specific video frames in accordance with a video streaming protocol, wherein a normal play time of each play request begins at $T_i$ and ends at $T_i+d$, wherein $T_i$ is a timestamp of an $i^{th}$ video frame, and wherein d does not exceed one frame duration and the first plurality of video frames, which are used to display the corresponding thumbnail images for the first navigation video strip, are identified after streaming the video to the client has commenced; and
determining whether each obtained video frame of the first plurality of video frames is an intra-coded frame or a predictive-coded frame, and for each obtained video frame that is a predictive-coded frame, discarding the obtained video frame and obtaining a subsequent intra-coded frame.

18. The method of claim 17, further comprising transmitting the first instructions to the client.

19. The method of claim 17, further comprising transmitting a reference to the first instructions to the client.

20. The method of claim 17, further comprising:
receiving a user selection of an option concerning how the video is managed while the first navigation video strip is displayed, wherein the option is selected from the group consisting of cropping the video and alpha-blending the video with the first navigation video strip.

21. A client system configured to facilitate enhanced navigation of a video, comprising:
a processor;
memory in electronic communication with the processor;
a video player configured to:
receive a video as it is streamed from a server over a computer network;
receive a first user request to display a first navigation video strip on a display device, wherein the first navigation video strip comprises a first plurality of video frames from the video;
obtain first instructions for displaying the first navigation video strip, wherein the first instructions do not include the first plurality of video frames;
obtain the first plurality of video frames by requesting specific video frames from the server by sending from the client system separate play requests for the specific video frames in accordance with a video streaming protocol, wherein a normal play time of each play request begins at $T_i$ and ends at $T_i+d$, wherein $T_i$ is a timestamp of an $i^{th}$ video frame, and wherein d does not exceed one frame duration and the first plurality of video frames, which are used to display corresponding thumbnail images for the first navigation video strip, are identified after streaming the video from the server has commenced;
determining whether each obtained video frame of the first plurality of video frames is an intra-coded frame or a predictive-coded frame, and for each obtained video frame that is a predictive-coded frame, discarding the obtained video frame and obtaining a subsequent intra-coded frame;
display the first navigation video strip on the display device in accordance with the first instructions, wherein displaying the first navigation video strip comprises retrieving the first plurality of video frames from the server and displaying the corresponding thumbnail images; and
receiving user input about a location where the first navigation video strip is displayed and displaying the first navigation video strip on the display device in accordance with the user input.

22. The client system of claim 21, further comprising a video strip generator that generates the first instructions in response to the first user request, and wherein obtaining the first instructions comprises receiving the first instructions from the video strip generator.

23. The client system of claim 21, wherein obtaining the first instructions comprises transmitting a first client request to the server to generate the first instructions.

24. The client system of claim 23, wherein obtaining the first instructions further comprises receiving the first instructions from the server.

25. The client system of claim 23, wherein obtaining the first instructions further comprises receiving a reference to the first instructions from the server.

26. The client system of claim 21, wherein the first instructions are formatted according to a Synchronized Multimedia Integration Language.

27. The client system of claim 21, wherein the first plurality of video frames are retrieved from the server in accordance with a Real Time Streaming Protocol (RTSP), and wherein requesting the specific video frames from the server comprises sending a separate RTSP PLAY request for each of the video frames.

28. The client system of claim 21, wherein the video player is further configured to support user interaction with the first navigation video strip.

29. The client system of claim 28, wherein supporting the user interaction comprises:
receiving a user selection of one of the first plurality of video frames; and
in response to the user selection, playing the video on the display device beginning at the selected video frame.

30. The client system of claim 28, wherein the amount of time separating adjacent video frames in the first navigation video strip is substantially equal to a first time interval, and wherein supporting the user interaction comprises:
receiving a second user request to modify the first time interval to a second time interval;
in response to the second user request, obtaining second instructions for displaying a second navigation video strip, wherein the amount of time separating adjacent video frames in the second navigation video strip is substantially equal to the second time interval; and
displaying the second navigation video strip on the display device in accordance with the second instructions.

31. The client system of claim 21, wherein the video player is further configured to receive user input about the number of video frames that are included in the first navigation video strip.

32. The client system of claim 21, wherein the video player is further configured to receive user input about the number of video frames in the first navigation video strip that are displayed on the display device.

33. The client system of claim 21, wherein the video player is further configured to:
receive a user selection of an option concerning how the video is managed while the first navigation video strip is displayed, wherein the option is selected from the group consisting of cropping the video and alpha-blending the video with the first navigation video strip.

34. The client system of claim 33, wherein the option is selected from the group consisting of playing the video, pausing the video, and stopping the video.

35. A server system configured to facilitate enhanced navigation of a video, comprising:
a processor;
memory in electronic communication with the processor;
a video stream server configured to stream a video to a client over a computer network; and
a video strip generator configured to:
receive a first client request to generate first instructions for displaying a first navigation video strip that comprises a first plurality of video frames from the video for displaying corresponding thumbnail images;
generate the first instructions, wherein the first instructions do not include the first plurality of video frames;
provide the first plurality of video frames to the client by receiving and responding to requests for specific video frames from the client, wherein receiving the requests for the specific video frames comprises receiving separate play requests sent by the client for the specific video frames in accordance with a video streaming protocol, wherein a normal play time of each play request begins at $T_i$ and ends at $T_i+d$, wherein $T_i$ is a timestamp of an $i^{th}$ video frame, and wherein d does not exceed one frame duration and the first plurality of video frames, which are used by the client to display the corresponding thumbnail images for the first navigation video strip, are identified after streaming the video to the client has commenced; and
determining whether each obtained video frame of the first plurality of video frames is an intra-coded frame or a predictive-coded frame, and for each obtained video frame that is a predictive-coded frame, discarding the obtained video frame and obtaining a subsequent intra-coded frame.

36. The server system of claim 35, wherein video strip generator is further configured to transmit the first instructions to the client.

37. The server system of claim 35, wherein the video strip generator is further configured to transmit a reference to the first instructions to the client.

38. The server system of claim 35, wherein the video strip generator is further configured to:
receive a user selection of an option concerning how the video is managed while the first navigation video strip is displayed, wherein the option is selected from the group consisting of cropping the video and alpha-blending the video with the first navigation video strip.

39. A non-transitory computer-readable medium comprising a set of instructions executable to:
receive a request to generate video strip instructions for displaying a navigation video strip that comprises a plurality of video frames from a video that is being streamed from a server to a client over a computer network, wherein the plurality of video frames that are included in the navigation video strip are independent of a current playback position of the video, and wherein the plurality of video frames from the server correspond to thumbnail images;
in response to the request, generate the video strip instructions while the video is being streamed from the server to the client, wherein the video strip instructions comprise instructions for sending from the client separate play requests for the plurality of video frames in the navigation video strip in accordance with a video streaming protocol, wherein a normal play time of each play request begins at $T_i$ and ends at $T_i+d$, wherein $T_i$ is a timestamp of an $i^{th}$ video frame, and wherein d does not exceed one frame duration and the plurality of video frames, which are used by the client to display the thumbnail images for the navigation video strip, are identified after streaming the video from the server has commenced; and
determining whether each obtained video frame of the first plurality of video frames is an intra-coded frame or a predictive-coded frame, and for each obtained video frame that is a predictive-coded frame, discarding the obtained video frame and obtaining a subsequent intra-coded frame.

40. The computer-readable medium of claim 39, wherein the set of instructions is further executable to provide the video strip instructions to a video player.

41. The computer-readable medium of claim 39, wherein the set of instructions is further executable to provide a reference to the video strip instructions to a video player.

42. The computer-readable medium of claim 39, wherein the set of instructions is further executable to receive user input about the number of video frames that are included in the navigation video strip.

43. The computer-readable medium of claim 39, wherein the set of instructions is further executable to receive user input about the number of video frames in the navigation video strip that are displayed on a display device.

44. The computer-readable medium of claim 39, wherein set of instructions is further executable to:
   receive a user selection of an option concerning how the video is managed while the first navigation video strip is displayed, wherein the option is selected from the group consisting of cropping the video and alpha-blending the video with the first navigation video strip.

45. The computer-readable medium of claim 44, wherein the option is selected from the group consisting of playing the video, pausing the video, and stopping the video.

* * * * *